US009116666B2

(12) United States Patent
Salter et al.

(10) Patent No.: US 9,116,666 B2
(45) Date of Patent: Aug. 25, 2015

(54) GESTURE BASED REGION IDENTIFICATION FOR HOLOGRAMS

(75) Inventors: Tom G. Salter, Seattle, WA (US); Alex Aben-Athar Kipman, Redmond, WA (US); Ben J. Sugden, Woodinville, WA (US); Robert L. Crocco, Jr., Seattle, WA (US); Brian E. Keane, Bellevue, WA (US); Christopher E. Miles, Seattle, WA (US); Kathryn Stone Perez, Kirkland, WA (US); Laura K. Massey, Redmond, WA (US); Mathew J. Lamb, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 207 days.

(21) Appl. No.: 13/487,079

(22) Filed: Jun. 1, 2012

(65) Prior Publication Data

US 2013/0321462 A1 Dec. 5, 2013

(51) Int. Cl.
*G09G 5/00* (2006.01)
*G06F 1/16* (2006.01)
*G06F 3/01* (2006.01)
*G06F 3/147* (2006.01)

(52) U.S. Cl.
CPC ............... *G06F 1/163* (2013.01); *G06F 3/011* (2013.01); *G06F 3/017* (2013.01); *G06F 3/147* (2013.01)

(58) Field of Classification Search
USPC ........................................................ 345/633
See application file for complete search history.

(56) References Cited

U.S. PATENT DOCUMENTS

| 7,301,648 | B2 | 11/2007 | Foxlin | |
|---|---|---|---|---|
| 7,877,707 | B2 * | 1/2011 | Westerman et al. | 715/863 |
| 8,073,198 | B2 * | 12/2011 | Marti | 382/103 |
| 8,146,020 | B2 * | 3/2012 | Clarkson | 715/863 |
| 8,648,822 | B2 * | 2/2014 | Weiss | 345/173 |
| 8,655,021 | B2 * | 2/2014 | Dal Mutto et al. | 382/103 |
| 2005/0052427 | A1 * | 3/2005 | Wu et al. | 345/173 |
| 2005/0063564 | A1 * | 3/2005 | Yamamoto et al. | 382/104 |
| 2007/0216642 | A1 | 9/2007 | Kneissler | |
| 2008/0030460 | A1 * | 2/2008 | Hildreth et al. | 345/156 |
| 2008/0231926 | A1 | 9/2008 | Klug et al. | |
| 2010/0031203 | A1 * | 2/2010 | Morris et al. | 715/863 |
| 2010/0083111 | A1 * | 4/2010 | de los Reyes | 715/702 |

(Continued)

OTHER PUBLICATIONS

Renoola, et al., "A Paper Presentation on Sixth Sense", Sri Vasavi Institute of Engineering and Technology, [retrieved on Apr. 24, 2012], Retrieved from the Internet: <URL: http://123seminarsonly.com/Seminar-Reports/025/80628404-Sixth-Sense-Technology.pdf>, 11 pages.

(Continued)

*Primary Examiner* — M Good Johnson
(74) *Attorney, Agent, or Firm* — Judy Yee; Micky Minhas

(57) ABSTRACT

Techniques are provided for allowing a user to select a region within virtual imagery, such as a hologram, being presented in an HMD. The user could select the region by using their hands to form a closed loop such that from the perspective of the user, the closed loop corresponds to the region the user wishes to select. The user could select the region by using a prop, such as a picture frame. In response to the selection, the selected region could be presented using a different rendering technique than other regions of the virtual imagery. Various rendering techniques such as zooming, filtering, etc. could be applied to the selected region. The identification of the region by the user could also serve as a selection of an element in that portion of the virtual image.

20 Claims, 14 Drawing Sheets

(56) References Cited

U.S. PATENT DOCUMENTS

| | | |
|---|---|---|
| 2010/0110368 A1 | 5/2010 | Chaum |
| 2010/0199232 A1 | 8/2010 | Mistry et al. |
| 2010/0211920 A1* | 8/2010 | Westerman et al. .......... 715/863 |
| 2011/0128555 A1 | 6/2011 | Rotschild et al. |
| 2011/0213664 A1 | 9/2011 | Osterhout et al. |
| 2011/0221669 A1* | 9/2011 | Shams et al. ................. 345/156 |
| 2012/0119978 A1* | 5/2012 | Border et al. ..................... 345/8 |
| 2012/0235887 A1* | 9/2012 | Border et al. ..................... 345/8 |
| 2012/0242697 A1* | 9/2012 | Border et al. ................. 345/633 |
| 2012/0270653 A1* | 10/2012 | Kareemi et al. ................ 463/33 |
| 2012/0287284 A1* | 11/2012 | Jacobsen et al. .............. 348/158 |
| 2012/0293544 A1* | 11/2012 | Miyamoto et al. ............ 345/620 |
| 2013/0050069 A1* | 2/2013 | Ota ................................ 345/156 |
| 2013/0265220 A1* | 10/2013 | Fleischmann et al. ........ 345/156 |

OTHER PUBLICATIONS

Ughini, et al., "EyeScope: A 3D Interaction Technique for Accurate Object Selection in Immersive Environments", In Proceedings of the SBC Symposium on Virtual Reality, May 2006, pp. 77-88, 12 pages.

* cited by examiner

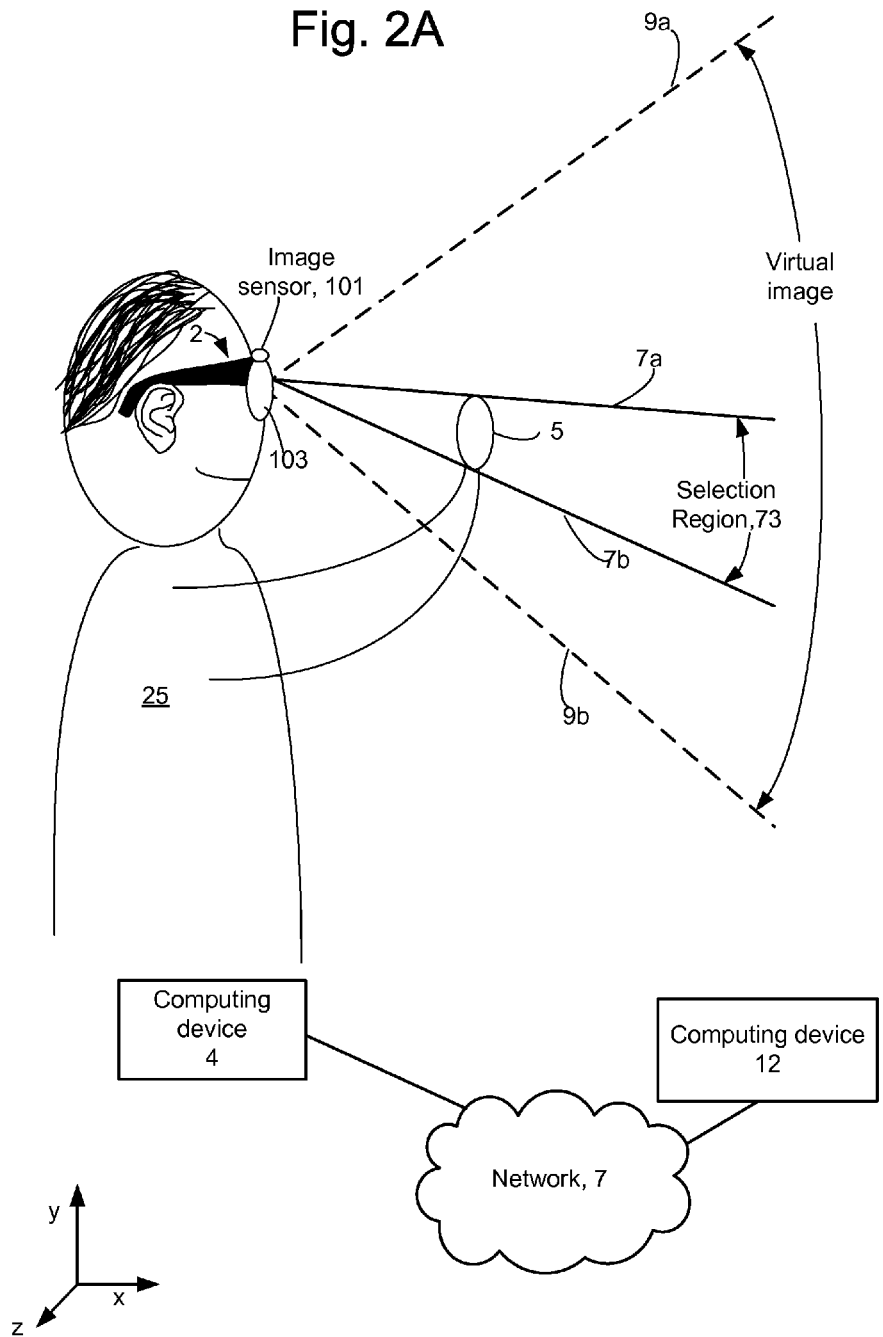

GESTURE BASED REGION IDENTIFICATION FOR HOLOGRAMS

BACKGROUND

Augmented or mixed reality is a technology that allows virtual imagery to be mixed with a user's actual view of the real world. A see-through, near-eye display may be worn by a user to view the mixed imagery of virtual and real objects. The display presents virtual imagery in the user's field of view.

SUMMARY

Techniques are provided for allowing a user to select a region within virtual imagery being presented in a see-through, near-eye display worn by the user. The user could select the region by using their hands to form a closed loop such that from the perspective of the user, the closed loop corresponds to the region in the virtual imagery the user wishes to select. Various rendering techniques such as zooming, filtering, etc. could be applied to the selected region.

One embodiment includes a method that allows a user to select a portion of virtual imagery being presented in see-through, near-eye display being worn by the user. Virtual imagery is presented in a see-through, near-eye display device. Image data of an environment that coincides with the virtual imagery from the perspective of a user wearing the see-through, near-eye display device is accessed. The image data is analyzed to identify a region select symbol being made by the user. A region in the image data that corresponds to the region select symbol is identified. A portion of the virtual imagery that corresponds to the region in the image data from the perspective of the user is determined.

One embodiment includes a display system comprising a see-through, near-eye display device that presents holographic imagery based on a region of the holographic imagery selected by a user. The device includes a see-through, near-eye display device, an image sensor, and logic in communication with the display device and the image sensor. The logic presents holographic imagery in the see-through, near-eye display device. The logic accesses image data of an environment that coincides with the holographic imagery from the perspective of a user wearing the see-through, near-eye display device. The logic analyzes the image data to identify a region select symbol being made by the user. The logic identifies a region in the image data that corresponds to the region select symbol. The logic correlates the region in the image data to a portion of the holographic imagery. The logic initiates a select event in response to identifying the region select symbol being made by the user.

One embodiment includes a computer storage device having instructions stored thereon which, when executed on a processor, cause the processor to present holographic imagery in response to a select event. The processor causes the see-through, near-eye display device to present holographic imagery. The instructions cause the processor to access image data of an environment that coincides with the holographic imagery from the perspective of a user wearing the see-through, near-eye display device. The instructions cause the processor to analyze the image data to identify a region select symbol being made by the user, and to identify a region in the image data that corresponds to the region select symbol. The instructions cause the processor to correlate the region in the image data to a portion of the holographic imagery, and to initiate a select event in response to identifying the region select symbol being made by the user. The instructions cause the processor to cause the see-through, near-eye display device to present the portion of the holographic imagery with a first display property and other portions of the holographic imagery with a second display property in response to the select event.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

In the drawings, like-numbered elements correspond to one another.

FIG. 2A depicts an overview of an environment in which embodiments may be practiced.

DETAILED DESCRIPTION

Techniques are provided for allowing a user to select a region within virtual imagery, such as a hologram, being presented in a see-through, near-eye display device worn by the user. The user could select the region by using their hands to form a closed loop such that from the perspective of the user, the closed loop corresponds to the region of the virtual imagery the user wishes to select. The user could select the region by using a prop, such as a picture frame. In response to the selection, the selected region could be presented using a different rendering technique than other regions of the virtual imagery. Various rendering techniques such as zooming, filtering, etc. could be applied to the selected region. The identification of the region by the user could also serve as a selection of an element in that portion of the virtual image, such that some action can be taken with respect to the selection of the element.

Figure 1A:
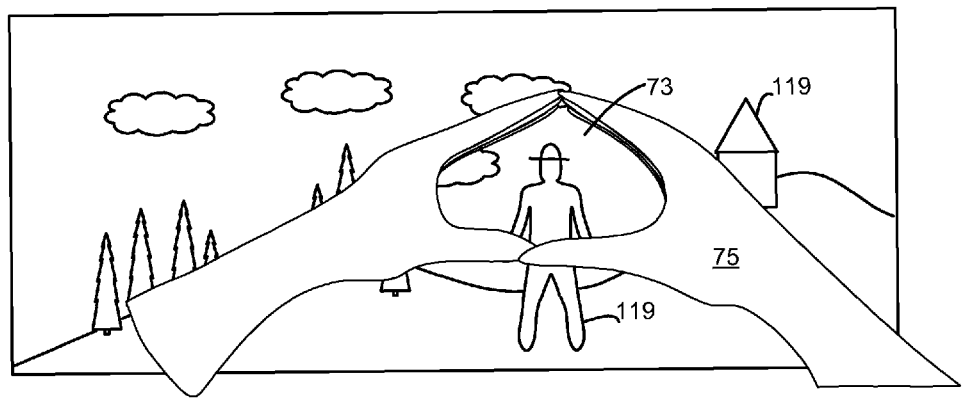
FIG. 1A shows a virtual image being presented in a see-through, near-eye display device.

FIG. 1A shows a virtual image being presented in a see-through, near-eye display device. FIG. 1A is from the perspective of the user wearing the display device. Note that the display device may allow the user to see both real world objects and the virtual image. In this example, the house and the person are virtual objects 119 while the other elements (trees, clouds, ground) are actual real world objects. Thus, the see-through, near-eye display device is able to augment reality. The virtual objects 119 can be presented as holograms such that if the user walked around the virtual object 119 it changes as if it is a real word object.

The user is selecting a portion of the virtual image by holding his/her hands 75 up and forming a closed loop. Note that the hands (and portions of arms) in FIG. 1A represent the actual hands 75 of the user, as opposed to what is rendered in the HMD.

Figure 1B:
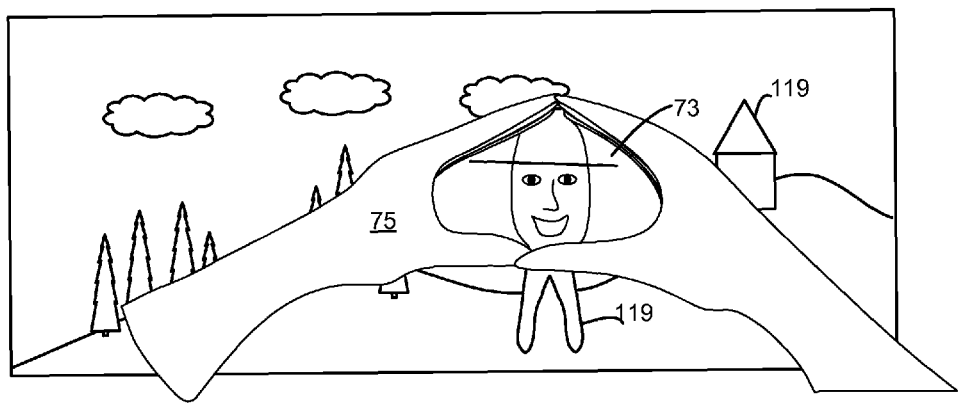
FIG. 1B shows one example in which the selected region in the virtual image is magnified.

In one embodiment, the see-through, near-eye display device responds to this selection by altering the virtual image in some manner. In one embodiment, the selected region 73 is presented with a different display property (e.g., rendering technique) than other portions of the virtual image. FIG. 1B shows one example in which the selected region 73 is magnified (or zoomed in). FIG. 1B is from the perspective of the user wearing the display device.

Figure 1C:
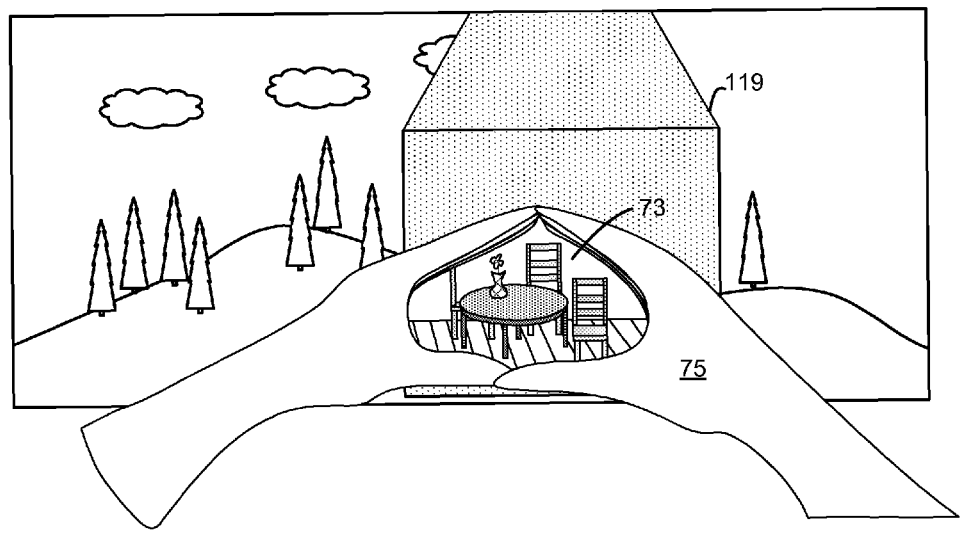
FIG. 1C shows example in which the selected region is presented in an "x-ray" mode.

FIG. 1C shows another example in which the selected region 73 is presented in an "x-ray" mode that allows the user to see through an otherwise opaque portion of the virtual image. In this example, the virtual image 119 of the house is presented in the HMD as an opaque image in the normal mode. However, when the user places their hands 75 in what is referred to herein as a "region select symbol" the user is able to see inside of the image 119 of the house.

Figure 1D:
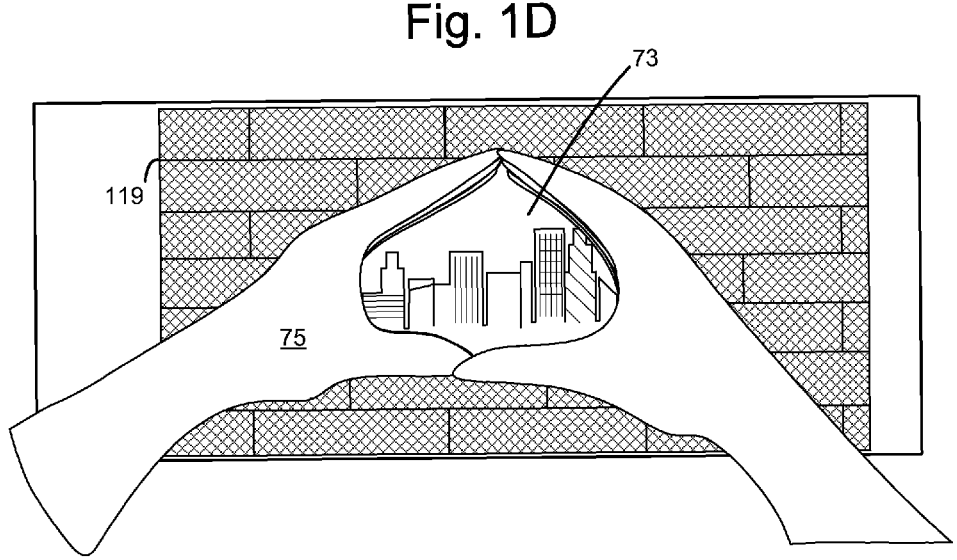
FIG. 1D shows an example in which the selected region shows a portal into a different world from the rest of the virtual image.

Many other possibilities exist. In one embodiment, the selection allows the user to see into a different world. FIG. 1D shows an example in which the selected region 73 shows a portal into a different world from the rest of the virtual image 119. In this example, the HMD is presenting a virtual image 119 of a brick wall. The user places their hands 75 into the form of the region select symbol to be able to see a portal into a different world, which is presented in the HMD as region 73.

In one embodiment, rather than using their hands the user selects the region by holding up some prop. For example, the user could hold up and peer through a cylinder or picture frame.

FIG. 2A depicts an overview of an environment in which embodiments may be practiced. The user 25 wears a see-through, near-eye display device 2, which is capable of displaying virtual images. The see-through, near-eye display device 2 may also be referred to as a head mounted display (HMD). The see-through, near-eye display device 2 is able to present holographic imagery, in one embodiment. These may be still images or moving images. The holographic imagery may also be referred to as virtual imagery.

The see-through, near-eye display device 2 has a display 103 for presented the virtual images to the user 25. In some embodiments, the display 103 has one or more see though lenses. From the perspective of the user 25 the virtual imagery may appear to be virtual objects in the real world. For example, the device 2 could generate a holographic image of a lamp such that it appears that the lamp is sitting on a desk in front of the user. If the user 25 walks around the lamp, the lamp changes to give the impression that it is a 3D object. Lines 9a and 9b roughly depict a region of space (i.e., the x-y plane portion of space) in which the virtual images appear to be from the perspective of the user 25.

In one embodiment, the see-through, near-eye display device 2 has an image sensor 101. The image sensor 101 could be forward facing such that it is able to image a region of the user's environment that generally coincides with the region in which the virtual image appears. The image sensor 101 may be used to determine where objects such as tables are located, such that virtual images can be properly rendered to appear as if they are a part of the environment. Thus, the user's view of reality may be augmented by the virtual images. The image sensor 101 could include a depth camera, an RGB camera, or both.

In this example, the user holds up a prop 5, which could be a closed loop, to select the region. The user 25 positions the prop 5 such that from the perspective of the user the region inside of the loop 5 coincides with the region in the virtual image that the user wants to select. Lines 7a and 7b roughly outline a region of space (i.e., the x-y plane region) from the user's perspective when looking through the prop 5. As discussed above, the user 25 could use a body part such as their hands to form a closed loop instead.

The see-through, near-eye display device 2 may have a processing unit 4 associated with it. In this example, the user 25 might carry the processing unit 4 in their pocket, wear it on their wrist, etc. The processing unit 4 may communicate with the HMD 2 by wireless communication or wireline. Further details of one example of an HMD 2 are discussed below. The processing unit 4 may communicate with another computing device 12 over a network 7. Computer device 12 could provide more computing power than processing unit 4, may have access to additional software, and data, etc.

Computer vision may be used to identify the user's hands or prop 5. Note that computer vision might be used to track hand gestures, eye movements, or any other physical movement or position. A capture device 101 and computing system 12 may be used to track and analyze user actions to enable this interaction. Further details of one embodiment of a capture device 101 and computing system 12 are discussed with respect to FIG. 7.

Figure 2B:
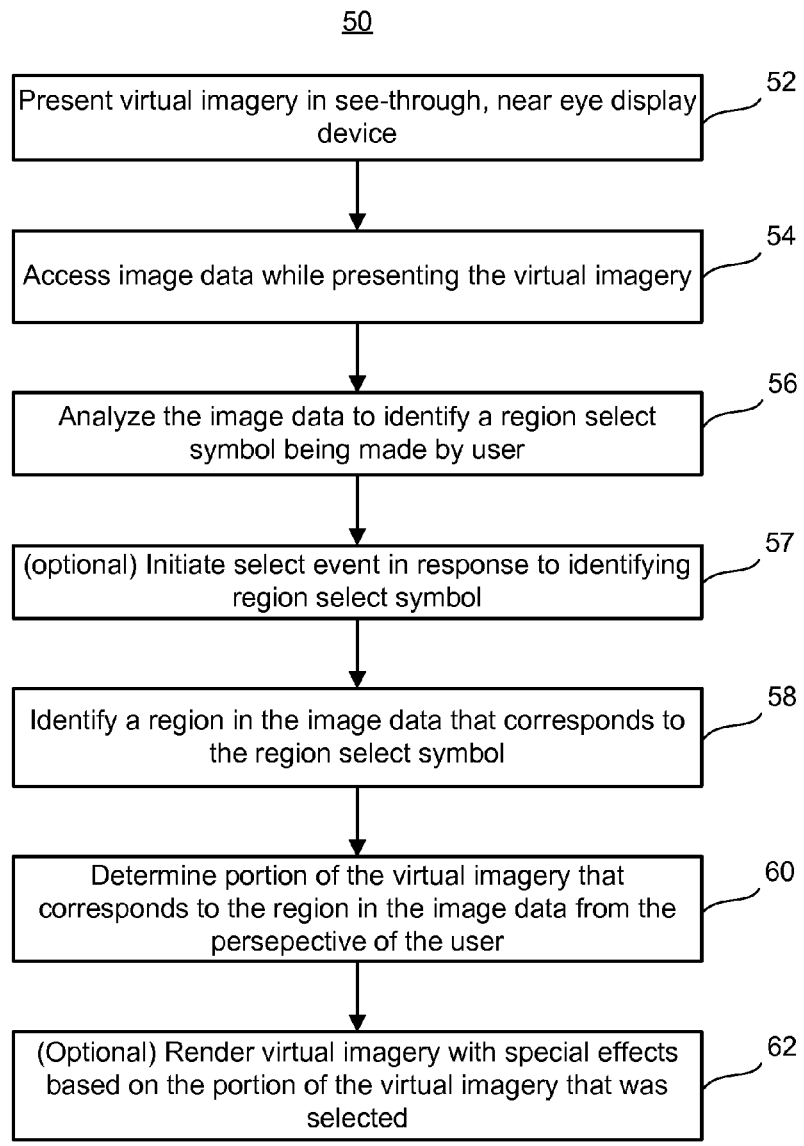
FIG. 2B is a flowchart of one embodiment of a process of a user selecting a region of virtual imagery being presented in an HMD.

FIG. 2B is a flowchart of one embodiment of a process 50 of a user selecting a region of virtual imagery being presented in an HMD 2. In one embodiment, steps of this process are performed by logic that may include any combination of hardware and/or software. Note that this logic could be spread out over more than one physical device. For example, some of the steps could be performed by logic residing within see-through, near-eye display device 2, and other steps performed by one or more computing devices 4, 12 in communication with the see-through, near-eye display device 2. A computing device may be in communication with the HMD 2 over a network 7, as one possibility.

In step 52, the see-through, near-eye display device 2 presents virtual imagery to the user in the HMD 2. This could be a still image or a moving image. The virtual imagery could be a holographic image. The virtual imagery could be presented in a manner that augments reality.

In step 54, image data is accessed while presenting the virtual imagery. This image data may be of an environment that coincides with the holographic imagery from the perspective of the user 25 wearing the see-through, near-eye display device 2. This image data will later be used to identify the region being selected by the user 25. This could be the same image data that the see-through, near-eye display device 2 uses to help render the virtual images realistically into the real world, or it could be other image data.

The image data could be accessed from a sensor 101 that is incorporated into the see-through, near-eye display device 2, but that is not a requirement. The sensor may be located near the user's eye such that it is able to capture a perspective that is similar to what the user sees.

The image data could include depth information, but that is not required. The depth information could be formed from various techniques including, but not limited to, an IR camera that uses time of flight, and stereo cameras. The image data could be RGB data.

In step 56, the image data is analyzed to identify a region select symbol being made by the user 25. In one embodiment, step 56 includes looking for a hand gesture. The hand gesture could identify an enclosed region being identified by a user. For example, skeletal tracking may be used to identify hands. Gesture recognition, or the like, may be used to determine whether the formation of the user's hands matches a template.

In one embodiment, a specific prop 5 is identified. Thus, the region select symbol does not need to be a part of the user's body. As one example, the user holds up a picture frame, which is interpreted as the region select symbol. Any physical prop could be used for the region select symbol.

In optional step 57, a select event is generated in response to identifying the region select symbol. Various actions can be taken in response to the select event. As one example, a special rendering technique can be applied to a region of the virtual image that is being selected by the user 25. Step 62 below provides further details. Other actions could also be taken in response to the select event, such as interpreting it as the selection of an element in the virtual image. Further details are discussed below.

In step 58, a region in the image data that corresponds to the region select symbol is identified. This is further discussed below.

In step 60, a portion of the virtual imagery that corresponds to the region in the image data from the perspective of the user is determined. Briefly, note that the image sensor 101 is not necessarily located such that the image data will contain the same perspective as the user 25. Thus, step 60 may perform a transform to adjust for this. Further details are discussed below.

In optional step 62, the see-through, near-eye display device 2 presents the virtual imagery with special effects based on the portion of the virtual imagery was selected. In one embodiment, the virtual imagery is modified based on the portion of the virtual imagery that is determined to correspond to the region in the image data from the perspective of the user. In one embodiment, the selected portion of the virtual imagery is presented with a first display property and other portions of the virtual imagery are presented with a second display property.

Figure 3:
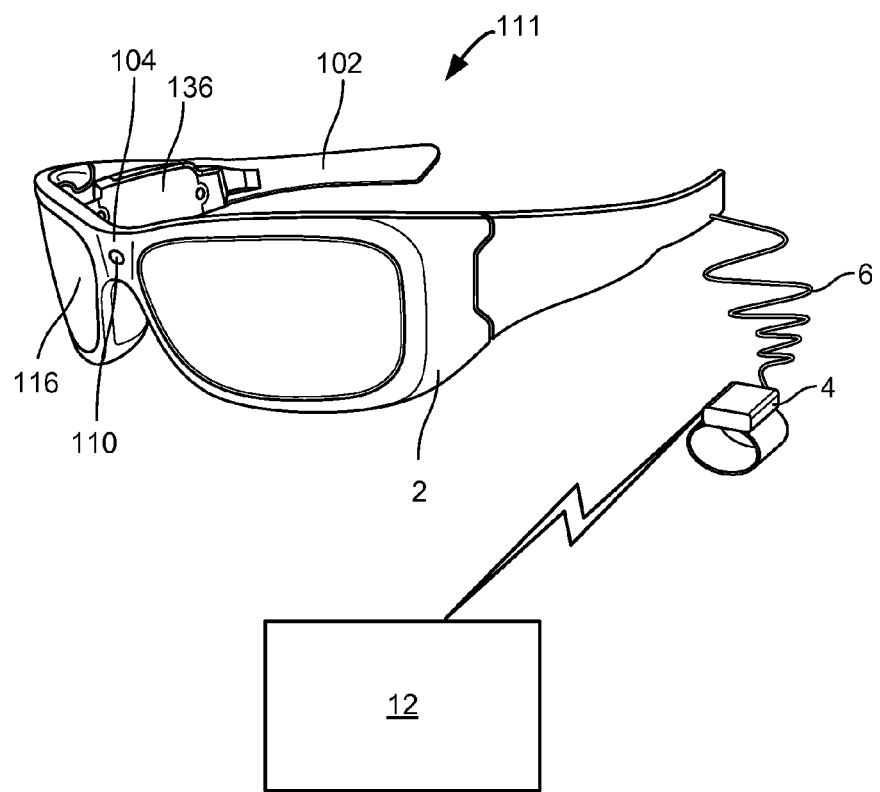
FIG. 3 is a diagram depicting example components of one embodiment of an HMD device.

As noted, an HMD 2 may be used in some embodiments. The following is a discussion of an example HMD 2 that may be used in various embodiments. FIG. 3 is a diagram depicting example components of one embodiment of an HMD system 111. The HMD system 111 includes an HMD device 2 in communication with processing unit 4 via wire 6. In other embodiments, HMD device 2 communicates with processing unit 4 via wireless communication. Note that the processing unit 4 could be integrated into the HMD device 2. Head-mounted display device 2, which in one embodiment is in the shape of glasses, including a frame with see-through lenses, is carried on the head of a person so that the person can see through a display and thereby see a real-world scene which includes an image which is not generated by the HMD device. More details of the HMD device 2 are provided below.

In one embodiment, processing unit 4 is carried on the user's wrist and includes much of the computing power used to operate HMD device 2. Processing unit 4 may communicate wirelessly (e.g., using WIFI®, Bluetooth®, infrared (e.g., IrDA or Infrared Data Association standard), or other wireless communication means) to one or more hub computing systems 12.

In one embodiment, hub computing system 12 may include a processor such as a standardized processor, a specialized processor, a microprocessor, or the like that may execute instructions stored on a processor readable storage device for performing the processes described herein.

Processing unit 4 and/or hub computing device 12, may be used to recognize, analyze, and/or track human (and other types of) targets. For example, the position of the head of the person wearing HMD device 2 may be tracked to help determine how to present virtual images in the HMD 2. Also, the user's hands could be recognized, analyzed, and/or tracked to determine when the user is selecting a portion of the virtual image.

Figure 4:
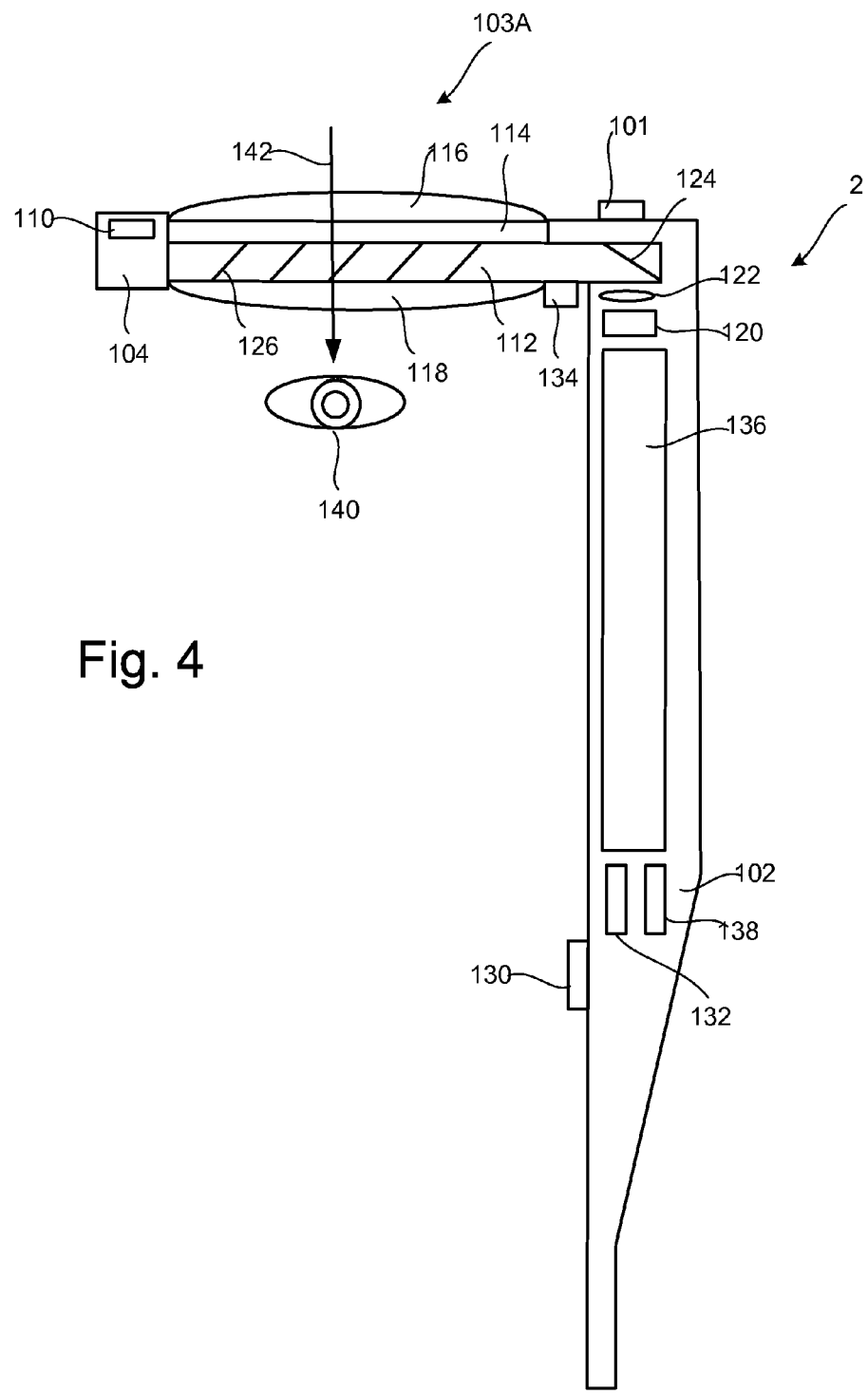
FIG. 4 is a top view of a portion of one embodiment of a HMD device.

FIG. 4 depicts a top view of a portion of one embodiment of HMD device 2, including a portion of the frame that includes temple 102 and nose bridge 104. Only the right side of HMD device 2 is depicted. Built into nose bridge 104 is a microphone 110 for recording sounds and transmitting that audio data to processing unit 4, as described below. At the front of HMD device 2 is room-facing camera 101 that can capture image data. This image data could be used to form a depth image. The room-facing camera 101 could project IR and sense reflected IR light from objects to determine depth. The room-facing video camera 101 could be an RGB camera. The images may be transmitted to processing unit 4 and/or hub computing device 12. The room-facing camera 101 faces outward and has a viewpoint similar to that of the user.

A portion of the frame of HMD device 2 will surround a display 103A (that includes one or more lenses). In order to show the components of HMD device 2, a portion of the frame surrounding the display is not depicted. In this embodiment, the display 103A includes a light guide optical element 112 (or other optical element), opacity filter 114, see-through lens 116 and see-through lens 118. In one embodiment, opacity filter 114 is behind and aligned with see-through lens 116, light guide optical element 112 is behind and aligned with opacity filter 114, and see-through lens 118 is behind and aligned with light guide optical element 112. See-through lenses 116 and 118 may be standard lenses used in eye glasses and can be made to any prescription (including no prescription). In one embodiment, see-through lenses 116 and 118 can be replaced by a variable prescription lens. In some embodiments, HMD device 2 will include only one see-through lens or no see-through lenses. In another alternative, a prescription lens can go inside light guide optical element 112. Opacity filter 114 filters out natural light (either on a per pixel basis or uniformly) to enhance the contrast of the virtual imagery. Light guide optical element 112 channels artificial light to the eye. More details of opacity filter 114 and light guide optical element 112 are provided below.

Mounted to or inside temple 102 is an image source, which (in one embodiment) includes microdisplay 120 for projecting a virtual image and lens 122 for directing images from microdisplay 120 into light guide optical element 112. In one embodiment, lens 122 is a collimating lens. A remote display device can include microdisplay 120, one or more optical components such as the lens 122 and light guide 112, and associated electronics such as a driver. Such a remote display device is associated with the HMD device, and emits light to a user's eye, where the light represents the physical objects that correspond to the electronic communications.

Control circuits 136 provide various electronics that support the other components of HMD device 2. More details of control circuits 136 are provided below with respect to FIG. 5. Inside, or mounted to temple 102, are ear phones 130, inertial sensors 132 and temperature sensor 138. In one embodiment, inertial sensors 132 include a three axis magnetometer 132A, three axis gyro 132B and three axis accelerometer 132C (See FIG. 5). The inertial sensors are for sensing position, orientation, sudden accelerations of HMD device 2. For example, the inertial sensors can be one or more sensors which are used to determine an orientation and/or location of user's head.

Microdisplay 120 projects an image through lens 122. There are different image generation technologies that can be used to implement microdisplay 120. For example, microdisplay 120 can be implemented in using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. The illumination is forward lit by either a white source or RGB source, depending on the technology. Digital light processing (DLP), liquid crystal on silicon (LCOS) and MIRASOL® (a display technology from QUALCOMM, INC.) are all examples of reflective technologies which are efficient as most energy is reflected away from the modulated structure. Additionally, microdisplay 120 can be implemented using an emissive technology where light is generated by the display. For example, a PicoP™-display engine (available from MICROVISION, INC.) emits a laser signal with a micro mirror steering either onto a tiny screen that acts as a transmissive element or beamed directly into the eye (e.g., laser).

Light guide optical element 112 transmits light from microdisplay 120 to the eye 140 of the person wearing HMD device 2. Light guide optical element 112 also allows light from in front of the HMD device 2 to be transmitted through light guide optical element 112 to eye 140, as depicted by arrow 142, thereby allowing the person to have an actual direct view of the space in front of HMD device 2 in addition to receiving a virtual image from microdisplay 120. Thus, the walls of light guide optical element 112 are see-through. Light guide optical element 112 includes a first reflecting surface 124 (e.g., a mirror or other surface). Light from microdisplay 120 passes through lens 122 and becomes incident on reflecting surface 124. The reflecting surface 124 reflects the incident light from the microdisplay 120 such that light is trapped inside a planar, substrate comprising light guide optical element 112 by internal reflection. After several reflections off the surfaces of the substrate, the trapped light waves reach an array of selectively reflecting surfaces 126. Note that only one of the five surfaces is labeled 126 to prevent over-crowding of the drawing.

Reflecting surfaces 126 couple the light waves incident upon those reflecting surfaces out of the substrate into the eye 140 of the user. As different light rays will travel and bounce off the inside of the substrate at different angles, the different rays will hit the various reflecting surface 126 at different angles. Therefore, different light rays will be reflected out of the substrate by different ones of the reflecting surfaces. The selection of which light rays will be reflected out of the substrate by which surface 126 is engineered by selecting an appropriate angle of the surfaces 126. More details of a light guide optical element can be found in U.S. Patent Application Publication 2008/0285140, Ser. No. 12/214,366, published on Nov. 20, 2008, incorporated herein by reference in its entirety. In one embodiment, each eye will have its own light guide optical element 112. When the HMD device has two light guide optical elements, each eye can have its own microdisplay 120 that can display the same image in both eyes or different images in the two eyes. In another embodiment, there can be one light guide optical element which reflects light into both eyes.

In some embodiments, the HMD has an opacity filter 114. Opacity filter 114, which is aligned with light guide optical element 112, selectively blocks natural light, either uniformly or on a per-pixel basis, from passing through light guide optical element 112. In one embodiment, the opacity filter can be a see-through LCD panel, electrochromic film, or similar device which is capable of serving as an opacity filter. Such a see-through LCD panel can be obtained by removing various layers of substrate, backlight and diffusers from a conventional LCD. The LCD panel can include one or more light-transmissive LCD chips which allow light to pass through the liquid crystal. Such chips are used in LCD projectors, for instance.

Opacity filter 114 can include a dense grid of pixels, where the light transmissivity of each pixel is individually controllable between minimum and maximum transmissivities. While a transmissivity range of 0-100% is ideal, more limited ranges are also acceptable. As an example, a monochrome LCD panel with no more than two polarizing filters is sufficient to provide an opacity range of about 50% to 90% per pixel, up to the resolution of the LCD. At the minimum of 50%, the lens will have a slightly tinted appearance, which is tolerable. 100% transmissivity represents a perfectly clear lens. An "alpha" scale can be defined from 0-100%, where 0% allows no light to pass and 100% allows all light to pass. The value of alpha can be set for each pixel by the opacity filter control circuit 224 described below. The opacity filter 114 may be set to whatever transmissivity is desired.

Figure 5:
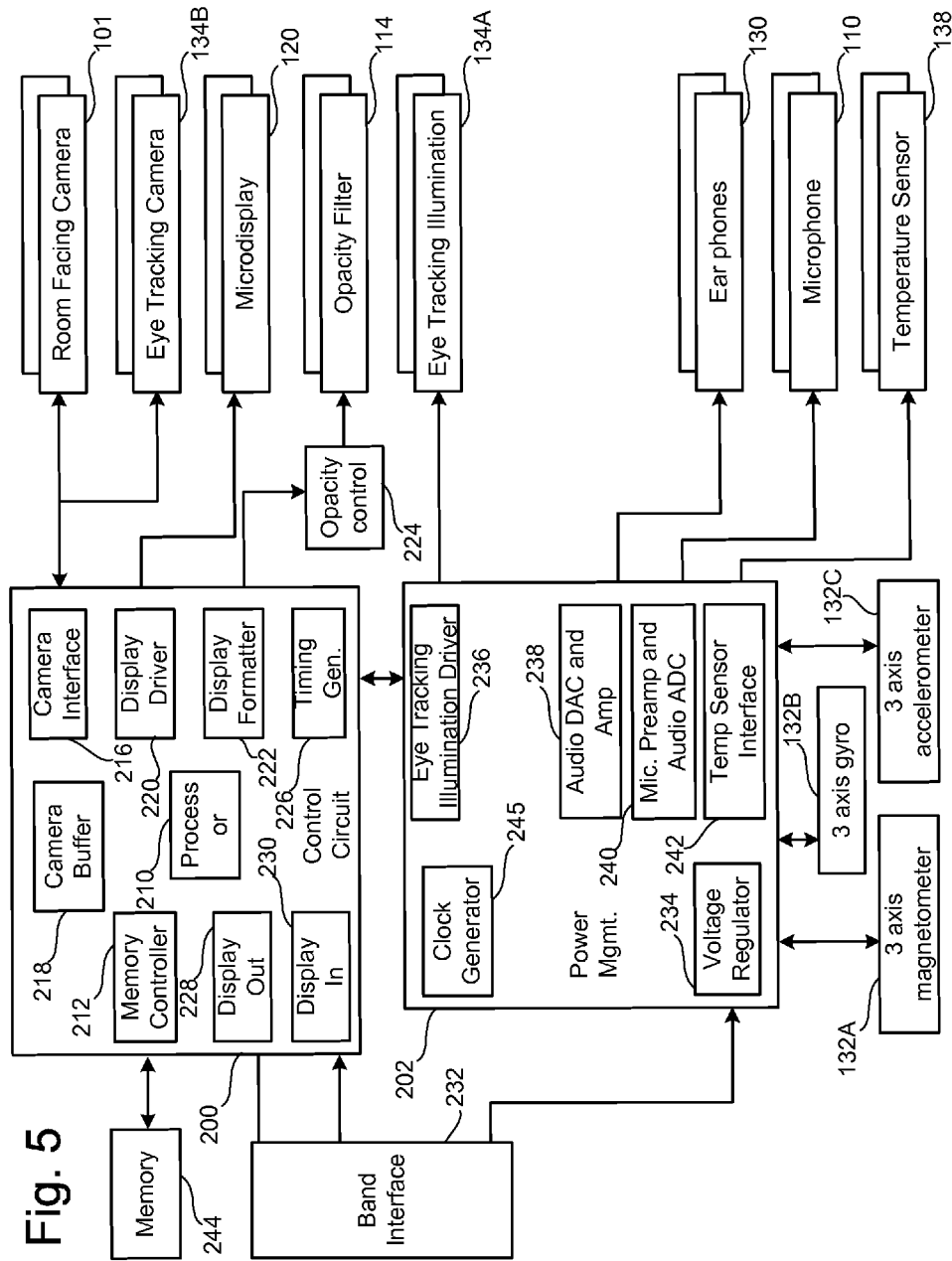
FIG. 5 is a block diagram of one embodiment of the components of a HMD device.
Figure 6:
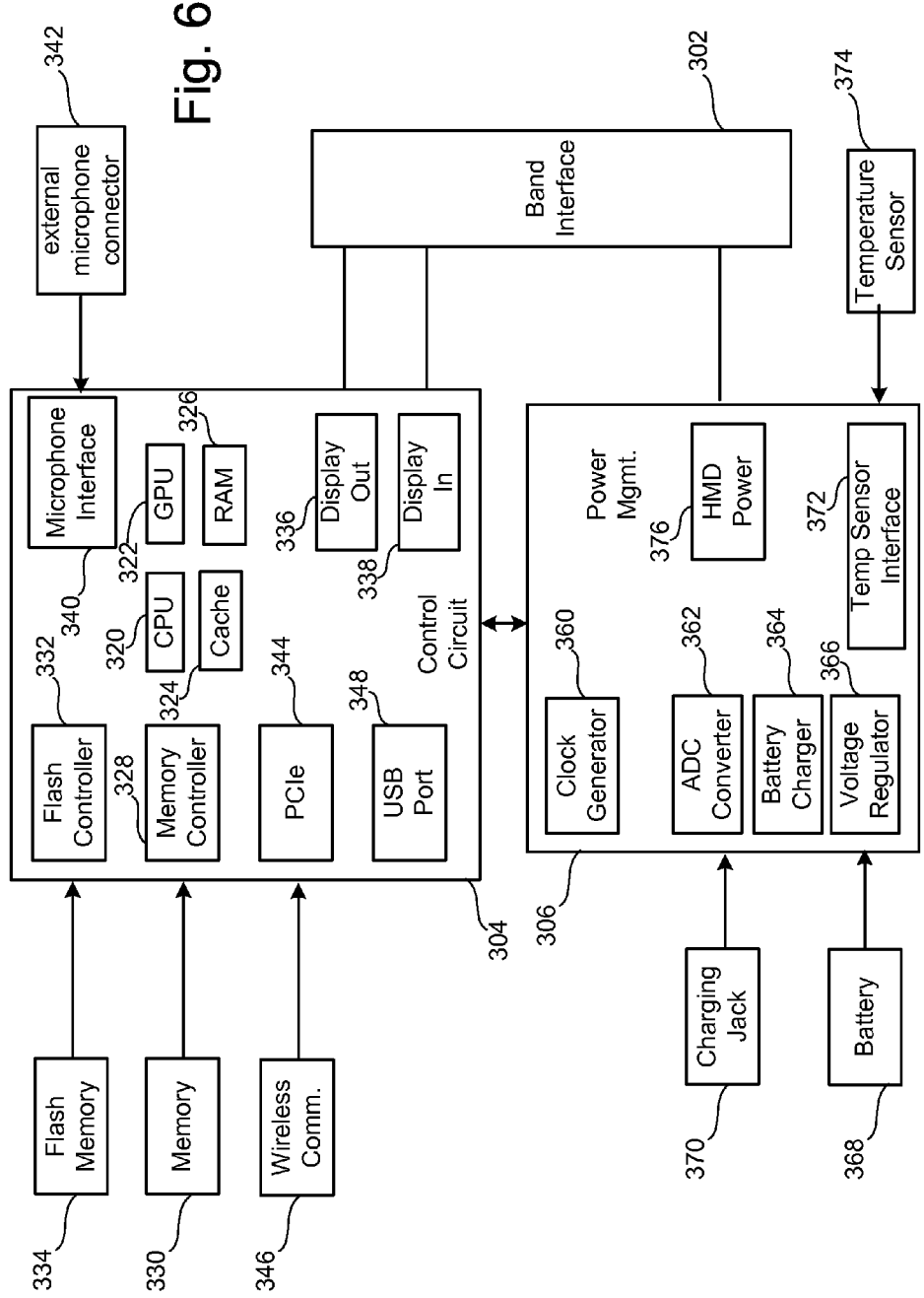
FIG. 6 is a block diagram of one embodiment of the components of a processing unit associated with a HMD device.

FIG. 5 is a block diagram depicting the various components of one embodiment of HMD device 2. FIG. 6 is a block diagram describing the various components of one embodiment of processing unit 4. Note that in some embodiments, the various components of the HMD device 2 and the processing unit 4 may be combined in a single electronic device. Additionally, the HMD device components of FIG. 5 include many sensors that track various conditions. Head-mounted display device may receive images from processing unit 4 and may provide sensor information back to processing unit 4. Processing unit 4, the components of which are depicted in FIG. 5, may receive the sensory information from HMD device 2 and also from hub computing device 12 (See FIG. 3).

Note that some of the components of FIG. 5 (e.g., room facing camera 101, eye tracking camera 134B, microdisplay 120, opacity filter 114, eye tracking illumination 134A, earphones 130, and temperature sensor 138) are shown in shadow to indicate that there are two of each of those devices, one for the left side and one for the right side of HMD device. Regarding the room-facing camera 101, in one approach one camera is used to obtain images using visible light. These images can be used to identify a region select symbol, such as a user's hands or a prop 5 using machine vision techniques. In another approach, two or more cameras with a known spacing between them are used as a depth camera to also obtain depth data for objects in a room, indicating the distance from the cameras/HMD device to the object. The cameras of the HMD device can essentially duplicate the functionality of the depth camera provided by the computer hub 12.

FIG. 5 shows the control circuit 200 in communication with the power management circuit 202. Control circuit 200 includes processor 210, memory controller 212 in communication with memory 244 (e.g., DRAM), camera interface 216, camera buffer 218, display driver 220, display formatter 222, timing generator 226, display out interface 228, and display in interface 230. In one embodiment, all of components of control circuit 200 are in communication with each other via dedicated lines or one or more buses. In another embodiment, each of the components of control circuit 200 is in communication with processor 210. Camera interface 216 provides an interface to the two room facing cameras 112 and stores images received from the room facing cameras in camera buffer 218. Display driver 220 drives microdisplay 120. Display formatter 222 provides information, about the images being displayed on microdisplay 120, to opacity control circuit 224, which controls opacity filter 114. Timing generator 226 is used to provide timing data for the system. Display out interface 228 is a buffer for providing images from room facing cameras 112 to the processing unit 4. Display in 230 is a buffer for receiving images to be displayed on microdisplay 120. Display out 228 and display in 230 communicate with band interface 232 which is an interface to processing unit 4.

Power management circuit 202 includes voltage regulator 234, eye tracking illumination driver 236, audio DAC and amplifier 238, microphone preamplifier audio ADC 240, temperature sensor interface 242 and clock generator 245. Voltage regulator 234 receives power from processing unit 4 via band interface 232 and provides that power to the other components of HMD device 2. Eye tracking illumination driver 236 provides the infrared (IR) light source for eye tracking illumination 134A, as described above. Audio DAC and amplifier 238 receives the audio information from earphones 130. Microphone preamplifier and audio ADC 240 provides an interface for microphone 110. Temperature sensor interface 242 is an interface for temperature sensor 138. Power management unit 202 also provides power and receives data back from three-axis magnetometer 132A, three-axis gyroscope 132B and three axis accelerometer 132C.

FIG. 6 is a block diagram describing the various components of processing unit 4. Control circuit 304 is in communication with power management circuit 306. Control circuit 304 includes a central processing unit (CPU) 320, graphics processing unit (GPU) 322, cache 324, RAM 326, memory control 328 in communication with memory 330 (e.g., D-RAM), flash memory controller 332 in communication with flash memory 334 (or other type of nonvolatile storage), display out buffer 336 in communication with HMD device 2 via band interface 302 and band interface 232, display in buffer 338 in communication with HMD device 2 via band interface 302 and band interface 232, microphone interface 340 in communication with an external microphone connector 342 for connecting to a microphone, PCI express interface 344 for connecting to a wireless communication device 346, and USB port(s) 348.

In one embodiment, wireless communication component 346 can include a WIFI® enabled communication device, Bluetooth communication device, infrared communication device, etc. The wireless communication component 346 is a wireless communication interface which, in one implementation, receives data in synchronism with the content displayed by the video display screen.

The USB port can be used to dock the processing unit 4 to hub computing device 12 in order to load data or software onto processing unit 4, as well as charge processing unit 4. In one embodiment, CPU 320 and GPU 322 are the main workhorses for determining where, when and how to render virtual images in the HMD.

Power management circuit 306 includes clock generator 360, analog to digital converter 362, battery charger 364, voltage regulator 366, HMD power source 376, and temperature sensor interface 372 in communication with temperature sensor 374 (located on the wrist band of processing unit 4). Analog to digital converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. HMD power source 376 provides power to the HMD device 2.

Figure 7:
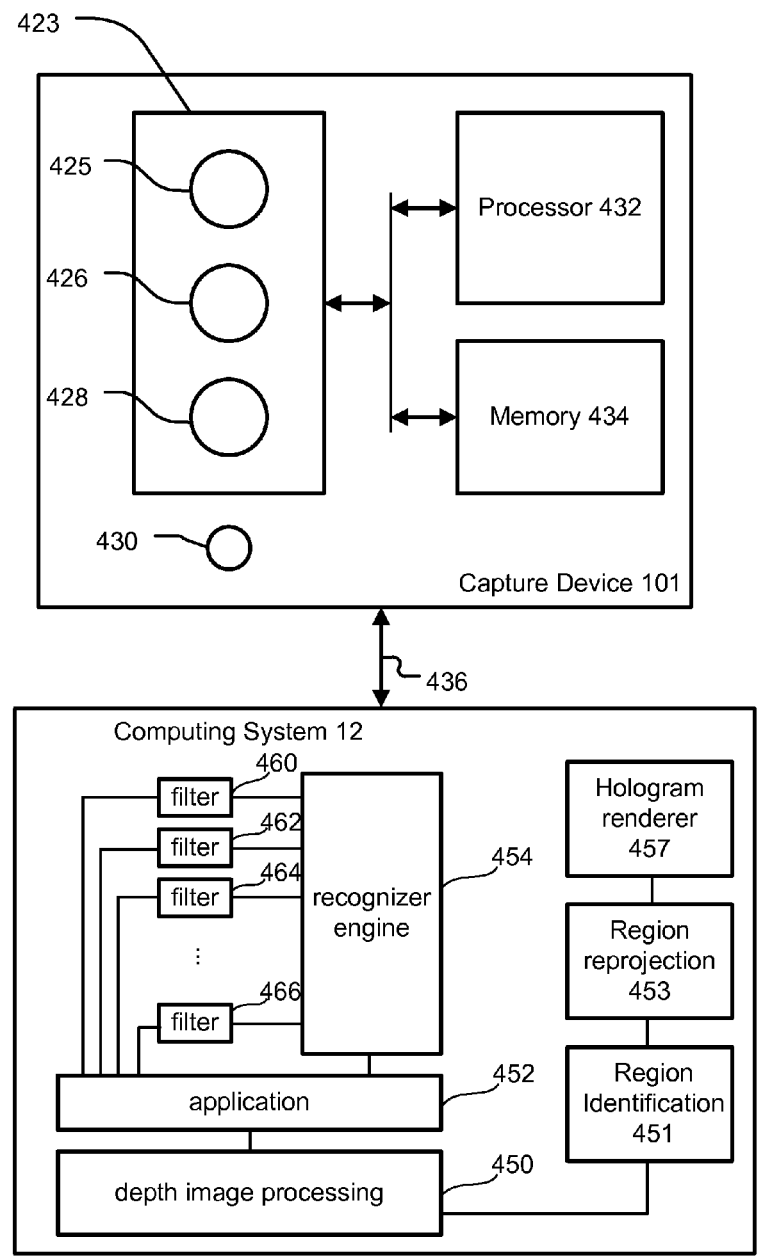
FIG. 7 is a block diagram of one embodiment of the components of a hub computing system used with a HMD device.

FIG. 7 illustrates an example embodiment of hub computing system 12 in communication with a capture device 101. The capture device 101 may be part of the HMD 2, but that is not required. According to an example embodiment, capture device 101 may be configured to capture depth information including a depth image that may include depth values via any suitable technique including, for example, time-of-flight, structured light, stereo image, or the like. According to one embodiment, the capture device 101 may organize the depth information into "Z layers," or layers that may be perpendicular to a Z axis extending from the depth camera along its line of sight.

Capture device 101 may include a camera component 423, which may be or may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

Camera component 423 may include an infrared (IR) light emitter 425, an infrared camera 426, and an RGB (visual image) camera 428 that may be used to capture the depth image of a scene. A 3-D camera is formed by the combination of the infrared emitter 425 and the infrared camera 426. For example, in time-of-flight analysis, the IR light emitter 425 of the capture device 101 may emit an infrared light onto the scene and may then use sensors (in some embodiments, including sensors not shown) to detect the backscattered light from the surface of one or more targets and objects in the scene using, for example, the 3-D camera 426 and/or the RGB camera 428. According to one embodiment, time-of-flight analysis may be used to indirectly determine a physical distance from the capture device 101 to a particular location on the targets or objects by analyzing the intensity of the reflected beam of light over time via various techniques including, for example, shuttered light pulse imaging.

In another example embodiment, capture device 101 may use a structured light to capture depth information. In such an analysis, patterned light (i.e., light displayed as a known pattern such as grid pattern, a stripe pattern, or different pattern) may be projected onto the scene via, for example, the IR light emitter 425. Upon striking the surface of one or more targets or objects in the scene, the pattern may become deformed in response. Such a deformation of the pattern may be captured by, for example, the 3-D camera 426 and/or the RGB camera 428 (and/or other sensor) and may then be analyzed to determine a physical distance from the capture device to a particular location on the targets or objects. In some implementations, the IR light component 425 is displaced from the cameras 425 and 426 so triangulation can be used to determined distance from cameras 425 and 426. In some implementations, the capture device 101 will include a dedicated IR sensor to sense the IR light, or a sensor with an IR filter.

According to another embodiment, the capture device 101 may include two or more physically separated cameras that may view a scene from different angles to obtain visual stereo data that may be resolved to generate depth information. Other types of depth image sensors can also be used to create a depth image.

The capture device 101 may further include a microphone 430, which includes a transducer or sensor that may receive and convert sound into an electrical signal. Microphone 430 may be used to receive audio signals that may also be provided by hub computing system 12.

In an example embodiment, the video capture device 101 may further include a processor 432 that may be in communication with the image camera component 423. Processor 432 may include a standardized processor, a specialized processor, a microprocessor, or the like that may execute instructions including, for example, instructions for receiving a depth image, generating the appropriate data format (e.g., frame) and transmitting the data to hub computing system 12.

Capture device 101 may further include a memory 434 that may store the instructions that are executed by processor 432, images or frames of images captured by the 3-D camera and/or RGB camera, or any other suitable information, images, or the like. According to an example embodiment, memory 434 may include random access memory (RAM), read only memory (ROM), cache, flash memory, a hard disk, or any other suitable storage component. As shown in FIG. 7, in one embodiment, memory 434 may be a separate component in communication with the image capture component 423 and processor 432. According to another embodiment, the memory 434 may be integrated into processor 432 and/or the image capture component 423.

Capture device 101 is in communication with hub computing system 12 via a communication link 436. The communication link 436 may be a wired connection including, for example, a USB connection, a FireWire connection, an Ethernet cable connection, or the like and/or a wireless connection such as a wireless 802.11b, g, a, or n connection. According to one embodiment, hub computing system 12 may provide a clock to capture device 101 that may be used to determine when to capture, for example, a scene via the communication link 436. Additionally, the video capture device 101 provides the depth information and visual (e.g., RGB or other color) images captured by, for example, the 3-D camera 426 and/or the RGB camera 428 to hub computing system 12 via the communication link 436. In one embodiment, the depth images and visual images are transmitted at 30 frames per second; however, other frame rates can be used.

Hub computing system 12 includes depth image processing module 450. Depth image processing may be used to determine depth to various objects in the field of view (FOV).

Recognizer engine 454 is associated with a collection of filters 460, 462, 464, . . . , 466 each comprising information concerning a gesture, action or condition that may be performed by any person or object detectable by capture device 101. For example, the data from capture device 101 may be processed by filters 460, 462, 464, . . . , 466 to identify when the user has formed an enclosed region with their hands, which may indicate that a region of the virtual image is being selected. As another example, some prop such as a cylinder or closed loop may be identified. In one embodiment, the filters are implemented with templates.

The computing system 12 also has region identification module 451, region re-projection module 453, and hologram renderer 457. Region identification module 451 is able to identify a region in the image data that corresponds to the region select symbol. Region re-projection module 453 is able to perform a transform of the image data collected by image sensor 101 to the virtual image as seen from the perspective of the user 25. This compensates for the different perspective that the user 25 and image sensor 101 have with respect to region select symbol (e.g., user's hands or prop 5). Hologram renderer 457 is able to render holograms (or virtual images) in the HMD 2 such that the user 25 perceives the virtual images as seeming to appear in the real world. The holograms may seem to be 3D objects in that some seem closer to the user 25 and the virtual objects can change as the user 25 walks around them as a real world 3D object would change.

Capture device 101 provides RGB images (or visual images in other formats or color spaces) and depth images to hub computing system 12. The depth image may be a plurality of observed pixels where each observed pixel has an observed depth value. For example, the depth image may include a two-dimensional (2-D) pixel area of the captured scene where each pixel in the 2-D pixel area may have a depth value such as distance of an object in the captured scene from the capture device. Hub computing system 12 will use the RGB images and depth images to track a user's or object's movements. For example, the system may track a skeleton of a person using the depth images. There are many methods that can be used to track the skeleton of a person using depth images.

More information about recognizer engine 454 can be found in U.S. Patent Publication 2010/0199230, "Gesture Recognizer System Architecture," filed on Apr. 13, 2009, incorporated herein by reference in its entirety. More information about recognizing gestures can be found in U.S. Patent Publication 2010/0194762, "Standard Gestures," published Aug. 5, 2010, and U.S. Patent Publication 2010/0306713, "Gesture Tool" filed on May 29, 2009, both of which are incorporated herein by reference in their entirety.

Figure 8:
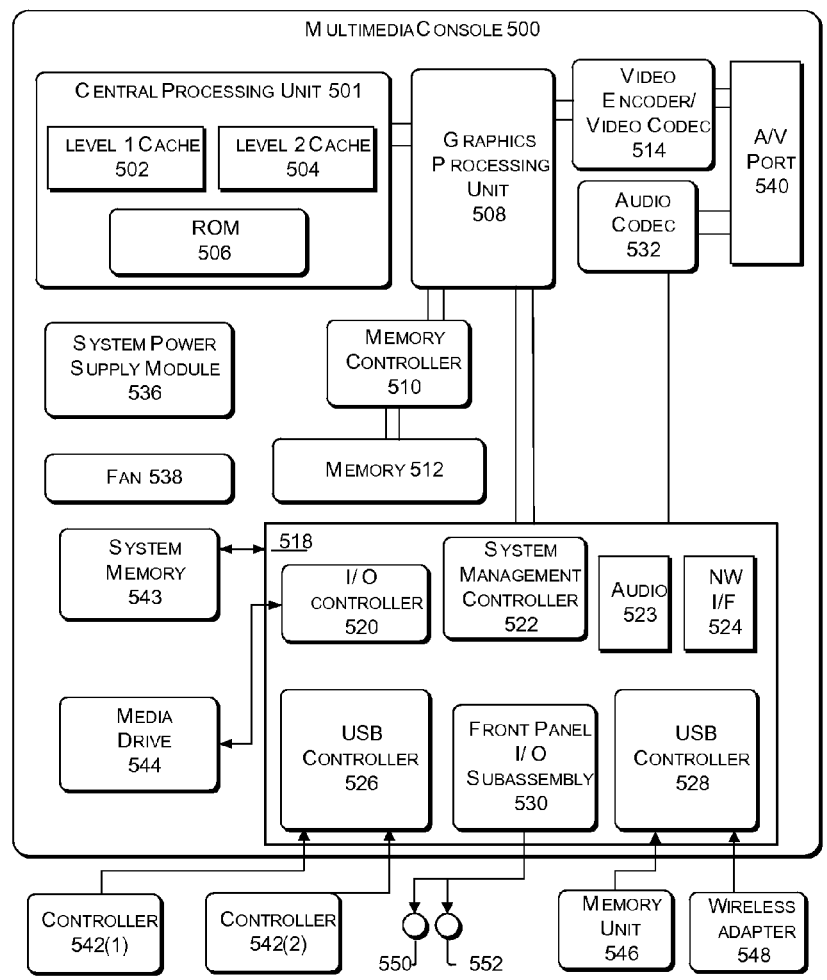
FIG. 8 is a block diagram of one embodiment of a computing system that can be used to implement the hub computing system described herein.

FIG. 8 illustrates an example embodiment of a computing system that may be used to implement hub computing system 12. As shown in FIG. 8, the multimedia console 500 has a central processing unit (CPU) 501 having a level 1 cache 502, a level 2 cache 504, and a flash ROM (Read Only Memory) 506. The level 1 cache 502 and a level 2 cache 504 temporarily store data and hence reduce the number of memory access cycles, thereby improving processing speed and throughput. CPU 501 may be provided having more than one core, and thus, additional level 1 and level 2 caches 502 and 504. The flash ROM 506 may store executable code that is loaded during an initial phase of a boot process when the multimedia console 500 is powered on.

A graphics processing unit (GPU) 508 and a video encoder/video codec (coder/decoder) 514 form a video processing pipeline for high speed and high resolution graphics processing. Data is carried from the graphics processing unit 508 to the video encoder/video codec 514 via a bus. The video processing pipeline outputs data to an A/V (audio/video) port 540 for transmission to a television or other display. A memory controller 510 is connected to the GPU 508 to facilitate processor access to various types of memory 512, such as, but not limited to, a RAM (Random Access Memory).

The multimedia console 500 includes an I/O controller 520, a system management controller 522, an audio processing unit 523, a network interface 524, a first USB host controller 526, a second USB controller 528 and a front panel I/O subassembly 530 that are preferably implemented on a module 518. The USB controllers 526 and 528 serve as hosts for peripheral controllers 542(1)-542(2), a wireless adapter 548, and an external memory device 546 (e.g., flash memory, external CD/DVD ROM drive, removable media, etc.). The network interface 524 and/or wireless adapter 548 provide access to a network (e.g., the Internet, home network, etc.) and may be any of a wide variety of various wired or wireless adapter components including an Ethernet card, a modem, a Bluetooth module, a cable modem, and the like.

System memory 543 is provided to store application data that is loaded during the boot process. A media drive 544 is provided and may comprise a DVD/CD drive, Blu-Ray drive, hard disk drive, or other removable media drive, etc. The media drive 544 may be internal or external to the multimedia console 500. Application data may be accessed via the media drive 544 for execution, playback, etc. by the multimedia console 500. The media drive 544 is connected to the I/O controller 520 via a bus, such as a Serial ATA bus or other high speed connection (e.g., IEEE 1394 serial bus interface).

The system management controller 522 provides a variety of service functions related to assuring availability of the multimedia console 500. The audio processing unit 523 and an audio codec 532 form a corresponding audio processing pipeline with high fidelity and stereo processing. Audio data is carried between the audio processing unit 523 and the audio codec 532 via a communication link. The audio processing pipeline outputs data to the A/V port 540 for reproduction by an external audio user or device having audio capabilities.

The front panel I/O subassembly 530 supports the functionality of the power button 550 and the eject button 552, as well as any LEDs (light emitting diodes) or other indicators exposed on the outer surface of the multimedia console 100. A system power supply module 536 provides power to the components of the multimedia console 100. A fan 538 cools the circuitry within the multimedia console 500.

The CPU 501, GPU 508, memory controller 510, and various other components within the multimedia console 500 are interconnected via one or more buses, including serial and parallel buses, a memory bus, a peripheral bus, and a processor or local bus using any of a variety of bus architectures. Such architectures can include a Peripheral Component Interconnects (PCI) bus, PCI-Express bus, etc.

When the multimedia console 500 is powered on, application data may be loaded from the system memory 543 into memory 512 and/or caches 502, 504 and executed on the CPU 501. The application may present a graphical user interface that provides a consistent user experience when navigating to different media types available on the multimedia console 500. In operation, applications and/or other media contained within the media drive 544 may be launched or played from the media drive 544 to provide additional functionalities to the multimedia console 500.

The multimedia console 500 may be operated as a standalone system by simply connecting the system to a television or other display. In this standalone mode, the multimedia console 500 allows one or more users to interact with the system, watch movies, or listen to music. However, with the integration of broadband connectivity made available through the network interface 524 or the wireless adapter 548, the multimedia console 500 may further be operated as a participant in a larger network community. Additionally, multimedia console 500 can communicate with processing unit 4 via wireless adaptor 548.

When the multimedia console 500 is powered ON, a set amount of hardware resources are reserved for system use by the multimedia console operating system. These resources may include a reservation of memory, CPU and GPU cycle, networking bandwidth, etc. Because these resources are reserved at system boot time, the reserved resources do not exist from the application's view. In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop ups) are displayed by using a GPU interrupt to schedule code to render a popup into an overlay. The amount of memory used for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

After multimedia console 500 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 501 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager controls the gaming application audio level (e.g., mute, attenuate) when system applications are active.

Optional input devices (e.g., controllers 542(1) and 542(2)) are shared by gaming applications and system applications. The input devices are not reserved resources, but are to be switched between system applications and the gaming application such that each will have a focus of the device. The application manager preferably controls the switching of input stream, without knowing the gaming application's knowledge and a driver maintains state information regarding focus switches. In other embodiments, hub computing system 12 can be implemented using other hardware architectures. No one hardware architecture is required.

Figure 9A:
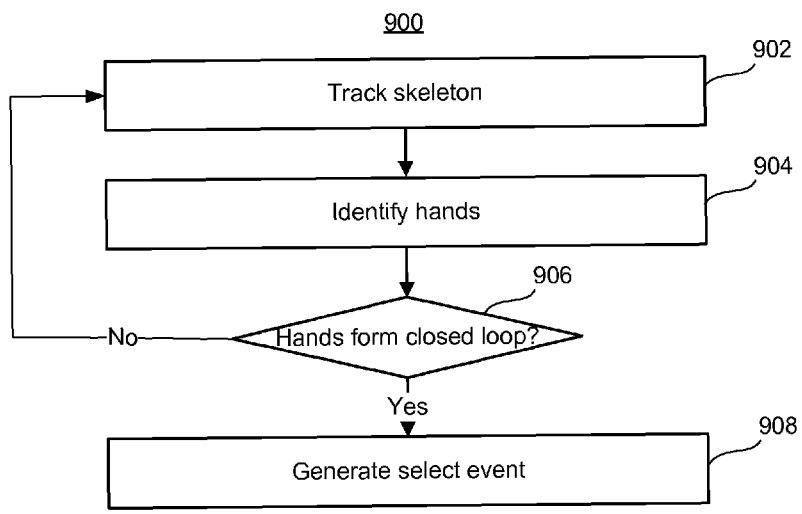
FIG. 9A is a flowchart of one embodiment of a process for identifying a region select symbol that is based on a user's hands.

FIG. 9A is a flowchart of one embodiment of a process 900 for identifying a region select symbol that is based on a user's hands. Process 900 may utilize depth images generated based on image data collected by image sensor 101. The process 900 is one embodiment of step 56 of process 50 of FIG. 2B. In step 902, skeletal tracking is performed based on depth images. These depth images may be used to perform skeletal tracking. Further details of skeletal tracking to perform gesture recognition are described in U.S. Patent Publication No. 2011/0289455, titled "Gestures and Gesture Recognition for Manipulating a User-Interface," filed on May 18, 2010, which is hereby incorporated by reference for all purposes.

Figure 9B:
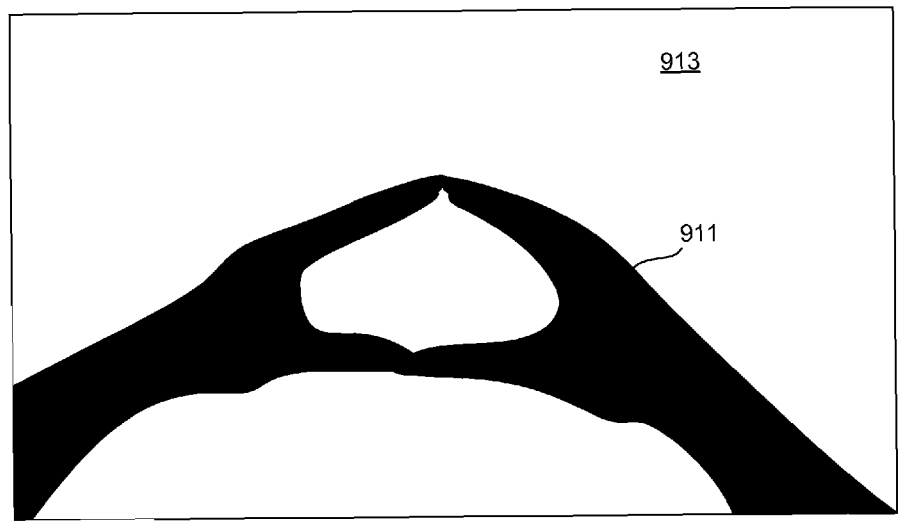
FIG. 9B is an example intermediate image formed in the process of FIG. 9A.

In step 904, the user's hands are identified based on the skeletal tracking. In one embodiment, an intermediate image is formed based on the following. The user's hands and arms are identified in the depth image as foreground, with the rest of the depth image being background. Then, the intermediate image can be formed with all pixels being either a foreground or a background pixel. Foreground pixels could have one value (e.g., black) and background pixels another (e.g., white). An example intermediate image is depicted in FIG. 9B. FIG. 9B shows an intermediate image in which foreground pixels 911 are black and correspond to the users hands and arms. The background pixels 913 are white, in this example.

In step 906, it is determined whether the user's hands form a closed loop. For example, the system looks for the user placing the tips of their thumbs together and the tips of their index fingers together. However, some other gesture can be used. The system may look for the user joining the tip of a thumb to the tip of a finger. The system could look for a specific gesture or for any number of gestures. In one embodiment, the system has a library of templates for helping with gesture recognition. These templates can be compared with the intermediate image formed in step 904.

In step 908, a select event is generated in response to identifying the user's hands being in a closed loop. Numerous actions can be taken in response to the select event such as rendering the virtual image based on which portion of the virtual image was selected by the user. This could include using a special effect in the selected portion of the virtual image.

In process 900, skeletal tracking based on a depth image is used to identify the user's hands. However, other techniques may be used to identify the user's hands. In one embodiment, an RGB image is used. Techniques for identifying features (such as hands) based on an RGB image are known in the art.

Figure 10:
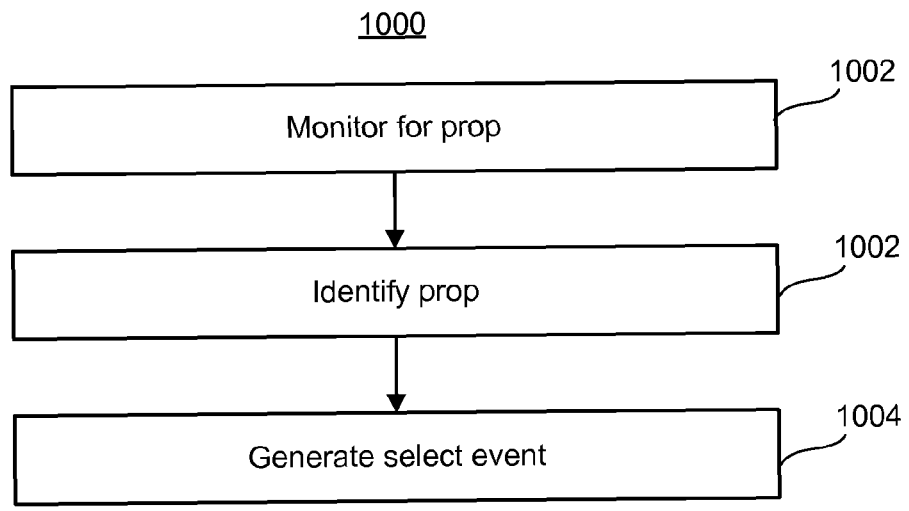
FIG. 10 is a flowchart of one embodiment of a process for identifying a region select symbol that is a prop other than a body part.

FIG. 10 is a flowchart of one embodiment of a process 1000 for identifying a region select symbol that is a prop other than a body part. In process 1000, the region select symbol is a prop 5, which could be held by the user 25. In one embodiment, the prop 5 forms a closed loop. One example is a picture frame. Another example is a cylindrical roll. The process 1000 is one embodiment of step 56 of process 50 of FIG. 2B. Process 1000 may use image data from a depth camera, an RGB camera, or another type of camera.

In step 1002, image data is analyzed to determine if a prop 5 is present. Prior to process 1000, the system may be trained to identity the prop. For example, the user 25 can train the system using a machine learning algorithm (MLA) to identify one or more props 5 of their own choice.

In step 1004, the prop 5 is identified. In one embodiment, the prop 5 is expected to be held in the user's hand. Therefore, skeletal tracking may be used to identify the user's hand. Then, the system can determine if the prop 5 is in the user's hand. However, skeletal tracking is not required.

In step 1006, a select event is generated in response to identifying the prop 5. Step 1004 is similar to the step of generating a select event in process 900.

Figure 11A:
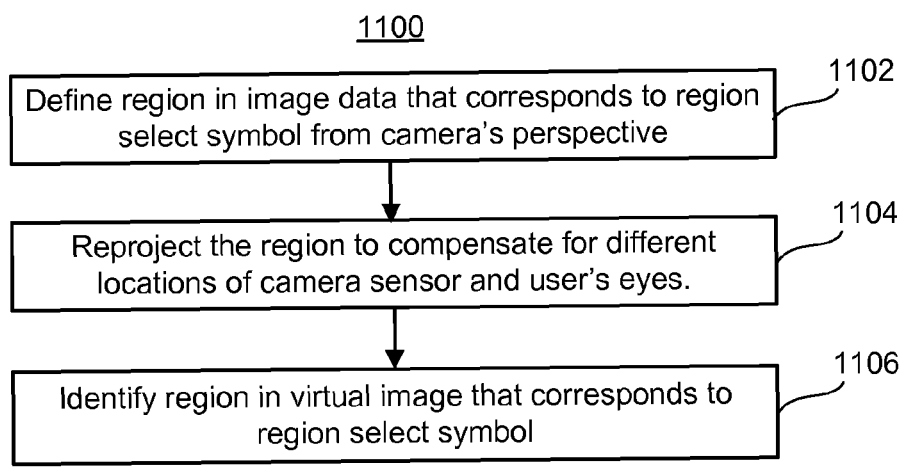
FIG. 11A is a flowchart of one embodiment of a process of re-projecting the image data so that it corresponds to the perspective of the user.

FIG. 11A is a flowchart of one embodiment of a process 1100 of re-projecting the image data so that it corresponds to the perspective of the user 25. Process 1100 is one embodiment of step 58 of FIG. 2B.

In step 1102, a region in the image data that corresponds to the region select symbol is identified. Note that this region is from the perspective of the image sensor 101. In one embodiment, this is accomplished by performing a floodfill of the intermediate image formed in step 904 of process 900. Recall that the intermediate image contained just foreground (e.g., hands) and background pixels. This intermediate image thus contains an enclosed region defined by the user's hands. The floodfill may start and the center of the enclosed region and fill outward to define a region enclosed by the user's hands.

Figure 11B:
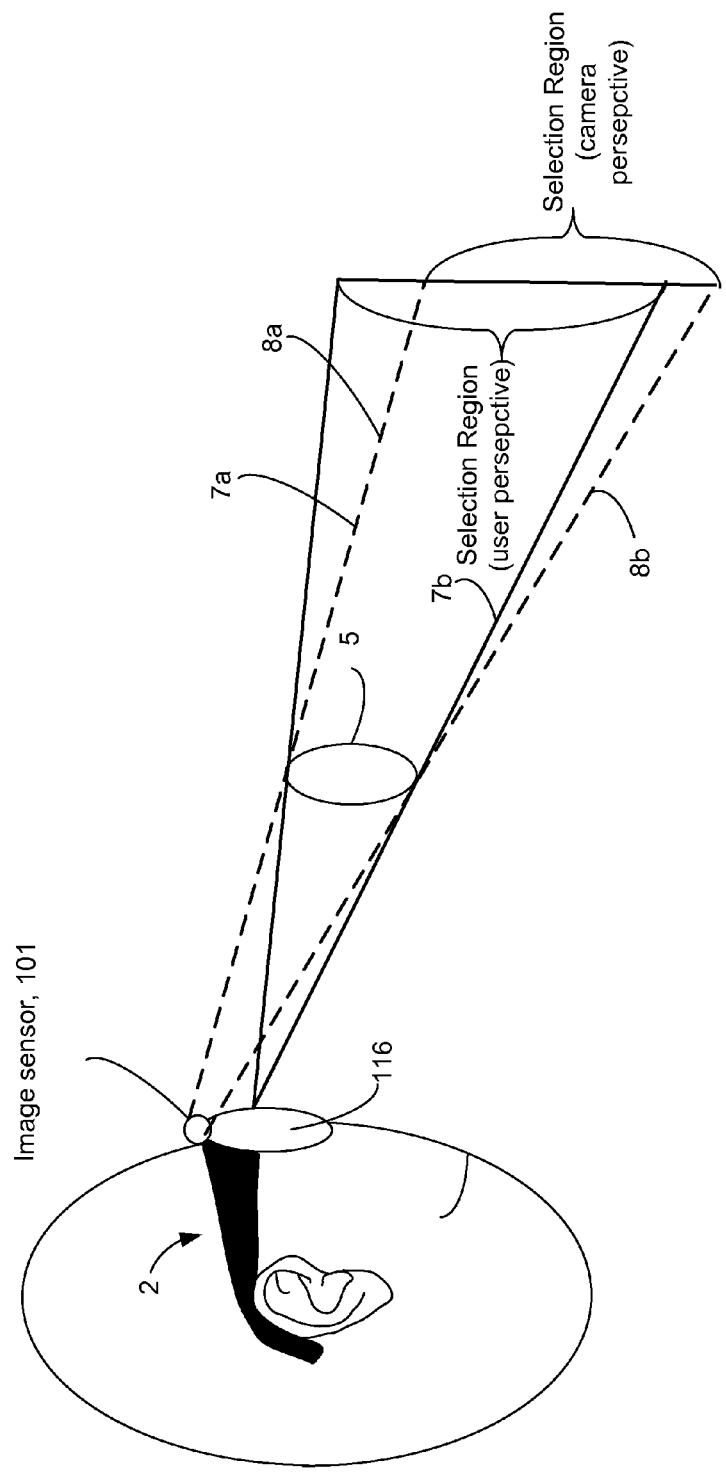
FIG. 11B is a diagram that illustrates re-projecting the image data so that it corresponds to the perspective of the user.

In step 1104, a region projection is performed to compensate for the different location of the user's eyes and the image sensor 101. Referring to FIG. 11B, note that the image sensor 101 might be located a little higher than the eyes in the y-direction. The image sensor 101 could also be located off to the side of the HMD 2 (such as on the frame along the user's temple), such that it is "left" or "right" of the user's eyes, from their perspective.

Thus, the depth image formed from the image data collected at image sensor 101 may have a slightly different perspective than the user 25 has. Referring to FIG. 11B, the user's perspective of the view through the prop 5 is outlined by lines 7a, and 7b. The image sensor's perspective through the prop 5 is outlined by lines 8a and 8b. Based on knowledge of the location of the image sensor 101 and the user's eyes, coordinates for the selection region are re-projected such that they accurately represent the user's perspective. Note that both intrinsic and extrinsic parameters may be used to make this re-projection. Intrinsic parameters of the camera may be used to factor in focal length, image format, principal point, lens distortion, etc. The location of the image sensor is one example of an "extrinsic" parameter.

In step 1106, a portion of the virtual image that corresponds to the region selected by the user is identified. Referring back to FIG. 2A, step 1106 determines the relationship between the selection region 73 and the virtual image (between lines 9a and 9b). As noted above, the virtual image is not actually projected into the region in front of the user 25. Rather, it may appear to the user 25 that the virtual image is augmenting the real world. However, based on how the virtual image is being presented in the HMD 2, the system is able to determine what portion of the virtual image corresponds to the selection region 73.

Figure 12:
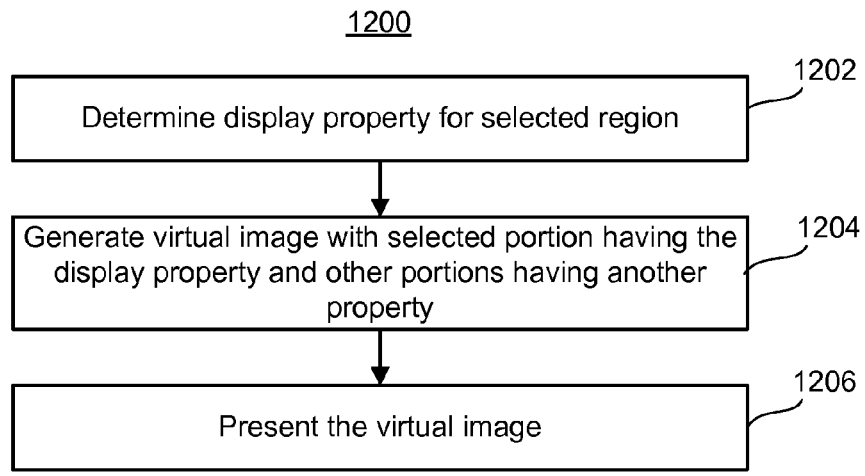
FIG. 12 is a flowchart of one embodiment of a process of presenting a virtual image in a near-eye display device based on a selected region of a virtual image.

FIG. 12 is a flowchart of one embodiment of a process 1200 of presenting a virtual image in a near-eye display device 2 based on a selected region of a virtual image. Process 1200 is one embodiment of step 62 of FIG. 2B.

In step 1202 a display property for the selected region is determined. The display property could be determined based on a gesture performed by the user. As one example, the same gesture that is used to select the region is used to identify the display property. As another example, the user provides a voice command to identify the type of display property. For example, the user says, "magnify," "zoom in," "x-ray," "highlight," etc.

In step 1204, a virtual image is generated that has the display property for the selected portion and another property for other parts of the virtual image. As one example, data for the selected portion virtual image is modified such that it can be presented as magnified.

In step 1206, a virtual image is presented. For example, referring to FIG. 1B, the selected region can be presented magnified (a first display property), whereas the rest can be viewed without magnification (a second display property). Stated another way, the selected region is zoomed in.

Figure 13:
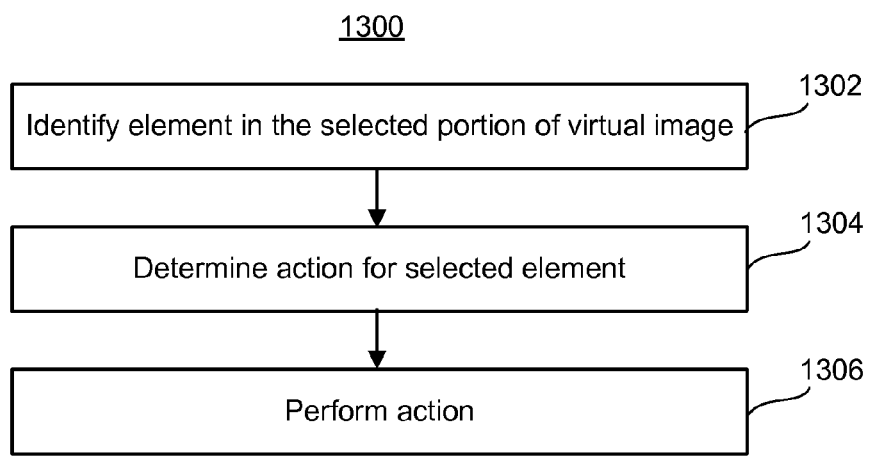
FIG. 13 is a flowchart of one embodiment of a process of performing a selection action in response to the user selecting a region of the virtual image.

FIG. 13 is a flowchart of one embodiment of a process 1300 of performing a selection action in response to the user selecting a region of the virtual image. Process 1300 is one action that can be taken in response to generating a select event. In process 1300, an element or region of the virtual image may serve as a selection element.

In step 1302, an element in the selected portion of the virtual image is identified as an element.

In step 1304, an action is determined for the selected element. Any action could be taken. For example, a software application could be triggered. As one possibility, more information regarding the selected element could be retrieved from the Internet and provided to the user 25 via audio, text, or image. Countless possibilities exist.

In step 1306, the action is performed.

In some embodiments, one or more steps of any of the processes described herein may be performed by executing instructions on one or more processors. Processors may access instructions that are stored on a variety of computer readable media. Computer readable media can be any available media that can be accessed by the processor and includes both volatile and nonvolatile media, removable and non-removable media. By way of example, and not limitation, computer readable media may comprise computer storage media. A computer storage device is one example of computer readable media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by processors. Combinations of the any of the above should also be included within the scope of computer readable media.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method comprising:
presenting a hologram in a see-through, near-eye display device;
accessing, by the see-through, near-eye display device, depth image data of an environment that coincides with the hologram from the perspective of a user wearing the see-through, near-eye display device;
analyzing, by the see-through, near-eye display device, the depth image data to identify a region select symbol being made by the user, the region select symbol being an enclosed loop;
identifying, by the see-through, near-eye display device, a region in the depth image data that corresponds to the enclosed loop;
determining, by the see-through, near-eye display device, a portion of the hologram presented in the see-through, near-eye display device that corresponds to the enclosed loop in the depth image data from the perspective of the user; and
displaying, in the see-through, near-eye display device, the portion of the hologram that corresponds to the enclosed loop from the perspective of the user with a first display property and other portions of the hologram with a second display property.

2. The method of claim 1, further comprising:
displaying, in the see-through, near-eye display device, the entire hologram with the second display property;
receiving, by the see-through, near-eye display device while the entire hologram is being displayed with the second display property, a selection of a modification to perform to the portion of the hologram that corresponds to the enclosed loop, wherein the modification is the first display property; and
modifying, in the see-through, near-eye display device, the portion of the hologram that corresponds to the enclosed loop in accordance with the selected modification, including changing from displaying the portion of the hologram that corresponds to the enclosed loop with the second display property to displaying the portion of the hologram that corresponds to the enclosed loop with the first display property while continuing to display the rest of the hologram with the second display property.

3. The method of claim 1, further comprising:
initiating, by the see-through, near-eye display device, a select event of an element within the portion of the hologram that corresponds to the enclosed loop from the perspective of the user; and
taking an action, by the see-through, near-eye display device, based on the element being selected.

4. The method of claim 1, wherein the analyzing the depth image data to identify a region select symbol being made by the user and the analyzing the depth image data to identify a region select symbol being made by the user include:
identifying, by the see-through, near-eye display device, at least one of the user's hands; and
determining, by the see-through, near-eye display device, that the at least one hand forms the enclosed loop.

5. The method of claim 4, wherein the identifying at least one of the user's hands includes performing skeletal tracking based on the depth image data.

6. The method of claim 1, wherein the analyzing the depth image data to identify a region select symbol being made by the user includes:
identifying, by the see-through, near-eye display device, a prop other than a body part that forms the enclosed loop.

7. The method of claim 1, wherein the displaying, in the see-through, near-eye display device, the portion of the hologram that corresponds to the enclosed loop from the perspective of the user with the first display property comprises:
presenting an x-ray view in the see-through, near-eye display device within the enclosed loop that allows the user to see through an otherwise opaque portion of the hologram being displayed in the see-through, near-eye display device.

8. A display system comprising:
a see-through, near-eye display device;
an image sensor;
logic in communication with the display device and the image sensor, the logic:
presents holographic imagery in the see-through, near-eye display device;
accesses depth image data of an environment that coincides with the holographic imagery from the perspective of a user wearing the see-through, near-eye display device;
analyzes the depth image data to identify a region select symbol being made by the user, the region select symbol being an enclosed loop;
correlates the enclosed loop in the depth image data to a portion of the holographic imagery;
displays, in the see-through, near-eye display device, the portion of the holographic imagery that corresponds to the enclosed loop from the perspective of the user with a first display property and other portions of the holographic imagery with a second display property.

9. The display system of claim 8, wherein the logic initiates a select event in response to identifying the region select symbol being made by the user, the portion of the holographic imagery that corresponds to the enclosed loop from the perspective of the user includes an element, the select event is a selection of the element, the logic further takes an action based on the user selecting the element.

10. The display system of claim 8, wherein the logic that analyzes the depth image data to identify a region select symbol being made by the user includes logic that identifies at least one of the user's hands forming the enclosed loop when analyzing the image data to identify the enclosed loop.

11. The display system of claim 10, wherein the logic that identifies at least one of the user's hands forming the enclosed loop includes logic that performs skeletal tracking based on the depth image data.

12. The display system of claim 8, wherein the logic that analyzes the depth image data to identify a region select symbol being made by the user includes logic that:
identifies a prop other than a body part that forms the enclosed loop.

13. The display system of claim 8, wherein at least a portion of the logic communicates with the see-through, near-eye display device over a network.

14. The display system of claim 8, wherein the logic:
displays the entire hologram in the see-through, near-eye display device with the second display property;
receives, while the entire hologram is being displayed with the second display property, a selection of a modification to perform to the portion of the hologram that corresponds to the enclosed loop, wherein the modification is the first display property; and
modifies the display of the portion of the hologram that corresponds to the enclosed loop in accordance with the selected modification, wherein the logic changes the portion of the hologram that corresponds to the enclosed loop from the second display property to the first display property.

15. The display system of claim 8, wherein, when the logic correlates the enclosed loop in the depth image data to the portion of the holographic imagery, the logic:
accesses a location of the image sensor;
accesses a location of an eye of the user; and
reprojects the region select symbol from a perspective of the image sensor to a perspective of the eye of the user to accurately represent the user's perspective.

16. A computer storage device having instructions stored thereon which, when executed on a processor, cause the processor to:

cause a see-through, near-eye display device to present holographic imagery, wherein the entire holographic imagery is presented with a first display property;
access depth image data of an environment that coincides with the holographic imagery from the perspective of a user wearing the see-through, near-eye display device;
analyze the depth image data to identify a region select symbol being made by the user, the region select symbol being an enclosed loop;
form an intermediate image that comprises foreground pixels and background pixels, the foreground pixels corresponding to the region select symbol;
perform a floodfill of the enclosed loop in the intermediate image to identify a region in the intermediate image that corresponds to the enclosed loop;
correlate the enclosed loop in the intermediate image to a portion of the holographic imagery;
initiate a select event in response to identifying the region select symbol being made by the user;
receive a selection of a second display property to apply to the portion of the holographic imagery; and
cause the see-through, near-eye display device to present the portion of the holographic imagery that corresponds to inside of the enclosed loop with the second display property and other portions of the holographic imagery that correspond to outside of the enclosed loop with the first display property.

17. The computer storage device of claim 16, wherein the second display property is selected from the group including:
zooming, presenting an x-ray, and presenting a view into a different world.

18. The computer storage device of claim 16, wherein the instructions that cause the processor to analyze the depth image data to identify a region select symbol being made by the user and to identify a region in the intermediate image that corresponds to the enclosed loop cause the processor to:
identify at least one of the user's hands; and
determine that at least one hand forms the enclosed loop.

19. The computer storage device of claim 16, wherein the instructions that cause the processor to identify at least one of the user's hands cause the processor to:
perform skeletal tracking based on the depth image data.

20. The computer storage device of claim 16, wherein the instructions that cause the processor to analyze the depth image data to identify a region select symbol being made by the user cause the processor to:
identify a prop other than a body part that forms the enclosed loop.

* * * * *